(12) United States Patent
Stecher

(10) Patent No.: US 7,097,392 B2
(45) Date of Patent: Aug. 29, 2006

(54) FREE-FLOWING SULFUR TRANSPORT, STORAGE AND USE TO PRODUCE ENERGY, FERTILIZER OR HYDROGEN WITHOUT CARBON DIOXIDE

(75) Inventor: Daniel G. Stecher, Gig Harbor, WA (US)

(73) Assignee: Stecher Proprietary Interests, Gig Harbor, WA (US)

( * ) Notice: Subject to any disclaimer, the term of this patent is extended or adjusted under 35 U.S.C. 154(b) by 259 days.

(21) Appl. No.: 10/734,741

(22) Filed: Dec. 11, 2003

(65) Prior Publication Data

US 2004/0247402 A1 Dec. 9, 2004

Related U.S. Application Data

(60) Provisional application No. 60/476,082, filed on Jun. 4, 2003.

(51) Int. Cl.
*B65G 53/00* (2006.01)

(52) U.S. Cl. .................................... 406/197
(58) Field of Classification Search ................ 406/197
See application file for complete search history.

(56) References Cited

U.S. PATENT DOCUMENTS

| | | | | |
|---|---|---|---|---|
| 3,339,985 | A * | 9/1967 | Every et al. .................. | 406/49 |
| 3,438,680 | A * | 4/1969 | Scheuerman et al. ......... | 406/48 |
| 3,443,837 | A * | 5/1969 | Meyer et al. ................ | 406/197 |
| 3,576,615 | A * | 4/1971 | Banks et al. .................. | 71/51 |
| 3,582,148 | A * | 6/1971 | Martin et al. ................. | 406/49 |
| 3,679,269 | A * | 7/1972 | Elliot ........................ | 406/47 |
| 3,761,136 | A * | 9/1973 | Every ........................ | 406/48 |
| 3,784,676 | A * | 1/1974 | Moss ..................... | 423/244.07 |
| 3,967,860 | A * | 7/1976 | Fonseca et al. ............. | 406/197 |
| 4,001,385 | A | 1/1977 | Sanders | |
| 4,029,752 | A * | 6/1977 | Cahn ......................... | 423/563 |
| 4,244,190 | A * | 1/1981 | Lieffers .................... | 60/641.5 |
| 4,530,827 | A * | 7/1985 | Heisel et al. ............... | 423/575 |

(Continued)

OTHER PUBLICATIONS

Hulse, Carl; "Natural Gas Outlook Troubling Greenspan"; 2003, *New York Times*, Jun. 11, 2003, 3 pages.

(Continued)

*Primary Examiner*—Joe Dillon, Jr.
(74) *Attorney, Agent, or Firm*—M. Henry Heines; Townsend and Townsend and Crew, LLP

(57) ABSTRACT

Elemental sulfur is combined with either liquid anhydrous ammonia, liquid sulfur dioxide, or both to form a solution or slurry which is transportable through pipelines or other transport vessels without a risk of clogging due to the environmental temperature drops that these vessels typically encounter. This unusual behavior and the advantages it offers arise from the discovery of unexpected solubility vs. temperature relationships of elemental sulfur in each of these two carriers. Among the advantages are significant improvements in the economics of many industrial chemical processes that involve the presence of sulfur either in elemental or chemically combined form, including natural gas or tar sands production and processing, hydrogen sulfide abatement, hydrogen production without carbon dioxide emissions, and sulfur extraction from ores, subterranean deposits, depositories, or fouled impaired industrial facilities. Large-scale ramifications for energy and fertilizer mineral resource utilization, greenhouse gas abatement, hydrogen economy, and nitrogen fertilizer production are taught.

22 Claims, 4 Drawing Sheets

U.S. PATENT DOCUMENTS

| | | | |
|---|---|---|---|
| 5,547,585 A | 8/1996 | Shepherd et al. | |
| 5,965,031 A | 10/1999 | Kitz et al. | |
| 6,342,169 B1 | 1/2002 | Hakka et al. | |
| 6,368,029 B1 * | 4/2002 | d'Aquin | 406/197 |
| 6,598,914 B1 | 7/2003 | Gore et al. | |

OTHER PUBLICATIONS

Hyne, J.B.; "Super Sour Gas- A New Sulphur Source for Exploitation"; *Sulphur International Conference*, Apr. 5-8, 1987, Houston, Texas.

Liuzzi, Robert, C.; "Testimony of Robert C. Liuzzi before the U.S. House Committee on Energy and Commerce Regarding Natural Gas Supply and Demand Issues"; *The United States House of Representatives Committee on Energy and Commerce*, Jun. 10, 2003.

Romero, Simon; "Short Supply of Natural Gas Raises Economic Worries"; 2003, *New York Times*, Jun. 17, 2003, 4 pages.

Zaman, J. et al.; "Production of hydrogen and sulfer from hydrogen sulfide"; 1995 *Fuel Processing Technology*, vol. 41, p. 159-198.

* cited by examiner

FREE-FLOWING SULFUR TRANSPORT, STORAGE AND USE TO PRODUCE ENERGY, FERTILIZER OR HYDROGEN WITHOUT CARBON DIOXIDE

CROSS REFERENCE TO RELATED APPLICATION

This application is related to U.S. Provisional Patent Application No. 60/476,082, filed Jun. 4, 2003, and claims all benefits legally capable of being offered by the provisional patent application. The entire contents of the provisional patent application are incorporated herein by reference.

BACKGROUND OF THE INVENTION

1. Field of the Invention

This invention resides in the technologies associated with solutions and suspensions of sulfur and sulfur-containing compounds, with particular interest to methods of transport of sulfur by pipeline and other vessels where the deposition of solids is sought to be avoided, eliminated, or removed, or where solids are purposely deposited. Among the many areas of application of this invention are chemical processes that produce elemental sulfur as a product, chemical processes and products in which sulfur is used in combination with ammonia or other nitrogen compounds, and in the recovery of both useful hydrogen values and sulfur values from chemical processes for the abatement of hydrogen sulfide, including those in which sulfur dioxide is or may be made as a by-product, co-product, intermediate product, or waste product of hydrogen production.

2. Description of the Prior Art

Western Canada and the United States each produce approximately $1 \times 10^7$ metric tons of elemental sulfur each year, primarily as a by-product of natural gas production and petroleum refining, and with the advent of NAFTA, Mexico stands to contribute comparable amounts through its natural gas production and native sulfur mining industries. Sulfur is also produced as a by-product in petroleum refinery operations, coal-fired power plant operations, and tar sands development, and in any industrial process that reduces the sulfur level in fuels or effluents for purposes of complying with air quality standards.

While industrial chemicals and commodities can be transported long distances by pipeline, in many cases more economically than by rail or other forms of shipment, pipeline transfer has not been used for sulfur or for only short distances at most. This is due to the high melting point of sulfur, the corrosiveness of sulfur when dissolved in typical solvents or when in contact with air or moisture, and the tendency of sulfur to precipitate from solution. When shipped as a solution or slurry, sulfur tends to deposit on the pipeline walls, resulting in plating, plugging, and line blocking, all of which lead to unreliability, high maintenance, and excessive power consumption.

Pipeline systems, like energetic systems in general, lose heat to the environment by radiation. Thus, in temperate zones under normal ambient conditions, the frictional heat and impulse power flow generated over time from the pipeline system combined with the heat loss that occurs at the exterior surface due to radiation cause the mass at the interior of the pipeline to be warmer than the pipeline itself. This causes the pipeline wall to be cooler, or permits it to be held at a cooler temperature, than the interior mass of moving product. As those skilled in the art are aware, the relation between solute and solvent in a solution is not static but instead one of dynamic equilibrium due to continual precipitation and re-dissolving under stable conditions. The solubility of a solute in most hydrocarbon solvents or in water or aqueous media declines markedly with decreasing temperature. As a result, the solute forms deposits over time, with more deposition occurring in cooler regions of the fluidic mass. This is indeed true in the case of sulfur, which has been found to precipitate faster than it dissolves in regions that are proximate to normally cooler heat transfer surfaces such as pipeline walls, flanges, fittings, and joints. The resulting deposits will plug the flow passages unless energy is supplied that will keep the fluidic mass moving fast enough to prevent plugs from forming. Methods for heating pipelines are complex and expensive.

Until recently, much of the sulfur produced in the United States was obtained by the mining of native sulfur reserves, particularly those of the Gulf Coast, using the high energy-consuming Frasch process. High energy prices have since caused curtailment or abandonment of many Frasch operations and many large mineral reserves of native elemental sulfur remain undeveloped.

The storage and disposal of sulfur pose challenges as well, particularly those arising from environmental concerns. Disposal in an environmentally sound yet economical manner is difficult to achieve. Disposal currently consists of converting molten sulfur to solid blocks for above-ground storage, injecting sulfur as $H_2S$ into geologic formations, or oxidizing hydrogen sulfide to sulfur oxides and injecting the sulfur oxides underground for storage.

Sulfur is primarily used in the production of sulfuric acid which is then used for producing phosphoric acid and phosphate derivatives at locations near large mineral deposits of phosphate rock. These locations are found primarily in Australia, Brazil, Florida, Idaho, the Middle East, and North Africa. Phosphate operations are typically very distant from sulfur production facilities, and many phosphate operations have been curtailed or shut down due to high energy prices or to supply disruptions caused by a lack of new power generating capacity despite increasing demand. This is particularly true in the western United States.

In the Middle East where the cost of power is extremely low, sulfur is conveyed through a long pipeline that is electrically traced to keep the sulfur at an elevated temperature and to facilitate re-starting of the flow when the pipeline becomes clogged due to sulfur solidification during upset conditions. Rail transport is used in Alberta, Canada, for shipping dry sulfur by unit trains to ports on the Pacific coast, and for shipping molten sulfur, which is susceptible to premature solidification, to points east and south. Shipping by unit train requires multiple locomotives, high-performance rail cars, and heavy-duty trackage, and is inherently inefficient due to the need to return empty rail cars to the sulfur source. When molten sulfur is shipped long distances, the tank cars must be steamed once they reach their destinations so that any solidified sulfur can be re-melted before the sulfur is off-loaded.

Of further potential relevance to this invention is the prior art relating to ammonia production. Ammonia plants are often located near natural gas reserves where sulfur is produced as a by-product. Anhydrous ammonia is conveyed by many modes of transportation including modified tank ships, barges, pipeline, rail, and truck, and large amounts of ammonia are imported from various parts of the world. A major proportion of the ammonia production capacity in North America is currently shut down due to high the cost of natural gas as a raw material and to low product prices.

The properties of mixtures of sulfur and anhydrous ammonia are reported by Ruff, O., and Hecht, L., in "Concerning Sulfammonium and Its Relation to Sulfur Nitride (writer's translation)," *Zeitschrift für Anorganische Chemie*, Vol. 70, p. 49–69, Leopold Voss, Leipzig, 1911, and by Ruff and Geisel, E., published under a similar title in *Berichte der Deutschen Chemische Gesellschaft*, Verlag Chemie, Berlin, v. 38, p. 2659, 1905. In these disclosures, Ruff et al. teach that sulfur and liquid anhydrous ammonia react to form sulfur nitride in accordance with the reaction:

$$10S + 4NH_3 \leftrightarrow 6H_2S + N_4S_4$$

This reaction is a recognized synthetic route to sulfur nitride. While stable in air, the nitride (which is also referred to as "nitrogen sulfide" in *Chemical Abstracts*) is an explosive that converts to the elements in a violent reaction if subjected to shock or rapid heating under certain conditions. Because of this explosive nature, few if any investigations of non-polymeric sulfur nitride have been reported.

Of still further potential relevance to this invention is the state of the art of sulfur dioxide. Sulfur dioxide is in large demand as a raw material for the manufacture of sulfuric acid, but a limiting factor is the high expense of transporting sulfur dioxide, as explained in the monograph by Rieber, M., *Smelter Emissions Controls: The Impact on Mining and the Market for Acid*, prepared for U.S. Department of the Interior Bureau of Mines, March, 1982, as quoted in U.S. Congress, Office of Technology Assessment, Copper: Technology and Competitiveness OTA-E-367 (Washington, D.C.: U.S. Government printing Office, September 1988, page 165, Box 8-A): "Liquid SO₂ has a very limited demand in the United States, but, owing to its relatively high price per unit weight, it can be shipped long distances. It is still extremely expensive to transport, however, because it requires special pressurized tank cars that usually return empty. The market is too small to justify cost saving measures such as unit trains or special ocean tankers."

Of still further potential relevance to this invention is the state of the art of natural gas production from natural gas reserves having high hydrogen sulfide content. Fouling and impairment of wells and pipelines by premature sulfur deposits is common and results in expensive maintenance problems and capacity losses due to shut-downs and extended off-line periods required for inspection, cleaning or replacement.

Of still further potential relevance to this invention is the state of the art of hydrogen sulfide and the recovery from hydrogen sulfide of both sulfur values and hydrogen values. Hydrogen sulfide is produced as a by-product of natural gas production, and also as a by-product of refinery operations and many processes that are intended to remove sulfur from fuels. Canada and the United States each produce about $1 \times 10^7$ metric tons of hydrogen sulfide per year. Because of its extreme acute toxicity, flammability, noxious odor, insidious odor sensory depression, and corrosiveness, almost all hydrogen sulfide is converted to elemental sulfur and water at or near the site where the hydrogen sulfide is produced. Conversion is achieved by the Claus process, in which one mole of hydrogen sulfide is oxidized to water and one mole of sulfur dioxide which is then reacted with two additional moles of hydrogen sulfide to produce elemental sulfur and more wastewater or steam. All the hydrogen value of hydrogen sulfide is thus lost to wastewater and low quality steam. In North America, for example, about $1.2 \times 10^6$ metric tons of hydrogen are lost in this way each year. The economics of hydrogen sulfide are summarized by Zaman and Chakma in "Production of hydrogen and sulfur from hydrogen sulfide," *Fuel Processing Technology* 41 (1995), 159–198, Elsevier Science B.V., as follows:

"The diverse attack on hydrogen sulfide to obtain two salable products is very striking. Every year a large amount of potential resource is being wasted and there is no doubt it should be stopped. The success in the development of a suitable technology for the production of hydrogen and sulfur will signify the attainment of the triple objectives of waste minimization, resource utilization, and environmental pollution reduction."

Hydrogen is commonly produced by steam reformation and water shift reactions using natural gas (methane) or other carbon-based reductants including petroleum derivatives and coal. Natural gas is in short supply, however, and shortages and high prices are likely to persist for the foreseeable future. Also, for every mole of methane consumed, the process generates a mole of carbon dioxide. Thus, for example, in the production of ammonia from hydrogen and nitrogen, about a million tons of carbon dioxide are produced (on a stoichiometric basis) for every million tons of ammonia made, in addition to the carbon dioxide produced by combustion to provide energy for other process needs. Some of the carbon dioxide can be consumed as a raw material to make urea, but the economic value that is gained from the use of carbon dioxide in this manner is insufficient to compensate economically for the loss of methane, since $CO_2$ is readily available from other sources in ways that do not involve methane consumption. Also, as those who are familiar with the proposals for a hydrogen economy are aware, the use of hydrogen will continue to grow and thereby exacerbate the serious problem of excess $CO_2$ emissions, a recognized contributor to global warming. This is because large-scale hydrogen production uses carbon-based reductants and will continue to do so for the foreseeable future despite significant advances in renewable energy technologies. Thus, in the production of hydrogen by methane reformation under the best circumstances, at least five and one half tons of carbon dioxide will be produced for each ton of hydrogen. This could be alleviated by producing hydrogen from non-carbon sources in a process whose by-product is a solid mineral such as gypsum rather than greenhouse gases.

Known schemes for producing hydrogen from hydrogen sulfide are as follows:

$$H_2S + CO \leftrightarrow COS + H_2 \qquad \text{Reaction 1}$$

$$H_2S + NO \leftrightarrow NOS + H_2 \qquad \text{Reaction 2}$$

$$H_2S \leftrightarrow \tfrac{1}{2}S_2 + H_2 \qquad \text{Reaction 3}$$

Reaction 1 is the subject of U.S. Pat. No. 4,618,723 (Herrington et al., Oct. 21, 1986)), while both Reactions 1 and 2 are discussed in U.S. Pat. No. 3,856,925 (Kodera et al., Dec. 24, 1974). The most striking recent development pertaining to Reaction 1 is work supported in part by the National Science Foundation and assigned to Lehigh University, disclosed in U.S. Pat. No. 6,497,855 (Wachs, Dec. 24, 2002). The Wachs patent teaches that an internal stream of COS can be catalytically oxidized with $O_2$ to yield $SO_2$ per the reaction $$COS + O_2 \rightarrow CO + SO_2 \qquad \text{Reaction 4}$$

while regenerating and recycling an internal stream of CO that is used to generate more hydrogen from fresh hydrogen sulfide feed according to Reaction 1 above. The overall reaction is as follows:

$$H_2S+O_2 \rightarrow H_2+SO_2 \qquad \text{Reaction 5}$$

The practicalities of this scheme are constrained by the burden of $SO_2$ disposition. The Wachs disclosure offers two alternatives for $SO_2$ disposal: 1) use in the production of sulfuric acid, and 2) recycle of $SO_2$ for reduction by two additional moles of hydrogen sulfide to produce elemental sulfur and water as for example by the Claus process. The former is thought to be an attractive choice at sites near large-scale consumers of sulfuric acid such as petroleum refineries. Unfortunately, however, the inefficiencies and high transportation costs of sulfuric acid make this impractical at remote hydrogen sulfide sources such as the Wyoming or Alberta sour gas fields. Large-scale remote sulfuric acid production would also have to compete with sulfuric acid produced as a smelter by-product. The disposition of surplus acid at remote locations raises environmental concerns, since acidulation of carbonaceous ore bodies such as limestone presents a variety of problems including excess $CO_2$ emissions.

Disposition of the $SO_2$ as recycle through the Claus process limits the yield of hydrogen from hydrogen sulfide to about one-third at best, based on the overall stoichiometry (combining Claus with Reaction 5) as follows:

$$3H_2S+O_2 \rightarrow H_2+2H_2O+3;8S_8 \qquad \text{Reaction 6}$$

The scheme of Reaction 6 also raises economic and environmental concerns due to its production of surplus elemental sulfur at remote locations. This reduces the amount of economic value that can be extracted from the hydrogen sulfide.

SUMMARY OF THE INVENTION

It has now been discovered that anhydrous ammonia and sulfur dioxide have utility and offer unexpected advantages as fluid vehicles for elemental sulfur whether by dissolving the elemental sulfur to form a solution or by suspending the elemental sulfur to form a slurry. This utility arises from heretofore unrecognized chemical and physical properties of both anhydrous ammonia and sulfur dioxide in liquid form. In the case of anhydrous ammonia, these properties include an atypical inverse temperature-solubility relationship, a reduced tendency to corrode ferrous metal, and the preferential dissolution of existing and nascent sulfur deposits on the internal surfaces of environmentally exposed pipelines and other vessels. In the case of sulfur dioxide, these properties include an unusually low rate of change in solubility with temperature over a broad temperature range, as well as a similarly reduced tendency to corrode ferrous metal. For both vehicles, the effect of these properties is the reduction or elimination of sulfur precipitation in the vessel that would otherwise be caused by heat exchange between the vessel and the environment, and accordingly a lessening of the occurrences of clogging, plating, or flow obstructions inside the vessel due to the precipitation, as compared to prior art methods that utilize water, aqueous solutions, or hydrocarbons as liquid vehicles. The invention thus resides in methods for the transport of elemental sulfur through long-distance pipelines and other vessels, and in methods for extracting elemental sulfur from geological formations including soil and rock formations, for extracting sulfur from naturally-occurring materials such as ores, rocks, and petroleum or petroleum fractions, and extracting sulfur from industrial mixtures or from industrial facilities in which sulfur is embedded, deposited, dispersed or dissolved. The invention also resides in methods for storing sulfur in geological formations, and particularly in subterranean formations such as caves or porous formations such as sand or porous rock. The invention further resides in solutions and slurries of sulfur in liquid sulfur dioxide as new compositions of matter.

Among the many applications and implementations of this discovery are the simultaneous supply of sulfur and ammonia or sulfur and sulfur dioxide to locations where either or both are used either commercially or industrially, for example as fertilizers or raw materials, and the transport of sulfur from remote sources to oxidation operations for use as fuel, such as for example power plants that serve population centers with a high energy demand. The discovery also facilitates the transport of sulfur to production facilities for phosphoric acid and phosphates, and to any facility in general that utilizes sulfur, while minimizing the generation of sulfur dust, dust explosions or fires, bacterial degradation, moisture exposure, acid contamination, corrosion, and cartage. This invention also finds utility in hydrogen sulfide abatement processes in which the recovery of hydrogen as $H_2$ gas is, or can be, accompanied by the generation of $SO_2$, which can only be removed by reaction with further $H_2S$ to form elemental sulfur and water, thereby converting the hydrogen value in $H_2S$ to water rather than recovering it as molecular $H_2$.

DETAILED DESCRIPTION OF THE INVENTION AND PREFERRED EMBODIMENTS

The solutions and slurries addressed in this specification and the appended claims are described in terms of the substances from which they are formed, i.e., elemental sulfur and either anhydrous ammonia or sulfur dioxide. The molecular forms of these substances may differ once they are combined, either by complex formation or chemical reaction, typically reversible, and any such transformation may occur to a greater or lesser degree depending on external conditions such as temperature and pressure. Thus, for example, the elemental sulfur may be present in the ammonia solution or slurry as a reaction product of sulfur and ammonia. The solutions and slurries addressed herein encompass any transformed states of the substances that result from their being combined. Thus, the term "solubility" when used refers to a gross solubility, which includes materials converting to liquid form either by reaction, by complexation, or by simply dissolving. While the presence of transformation products or the degree of transformation can be determined by conventional analytical methods, the efficacy and utility of this invention is not affected by such transformations since the transformations are generally reversible upon recovery of elemental sulfur from the solutions or slurries. In some cases, the substances find utility as a combination and do not require separation or recovery of one from the other. The combinations are not however intended to include products that are formed by the interaction of any of these three substances with other species or that are formed with the assistance of catalytic action or enhanced reaction conditions such as elevated temperature.

At various locations in this specification and the appended claims, certain materials and systems are characterized as "substantially anhydrous" or "substantially water-free." The term "substantially" in these characterizations denotes that the materials or systems are either entirely devoid of water or contain at most trace amounts, i.e., that any amount of water that is present is insufficient to affect the properties of the sulfur, ammonia, or sulfur dioxide or the solution or slurry in any way that would significantly lower the economic benefit of the use of the solution or slurry in the practice of this invention. For ammonia, the term preferably refers to a water content of about 0.3% or less by weight, more preferably about 500 ppm or less by weight, and most preferably about 100 ppm or less by weight. For sulfur dioxide, the term preferably refers to a water content of about 200 ppm or less by weight, more preferably about 100 ppm or less by weight, and most preferably about 50 ppm or less by weight.

Figure 1:
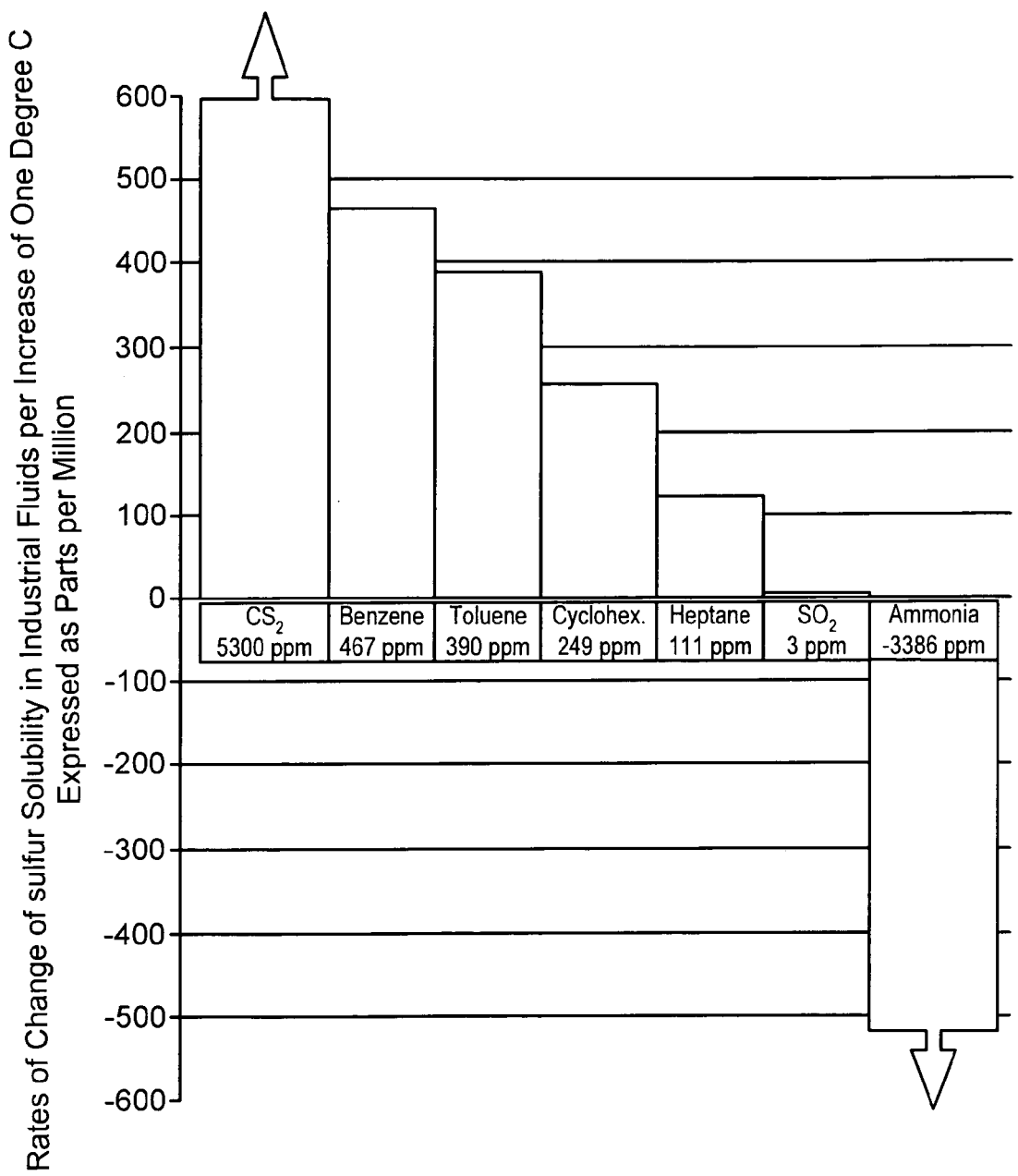
FIG. 1 is a bar graph comparing the rates of change of sulfur solubility with temperature in various liquids.

The change of sulfur solubility with temperature in various liquid carriers is shown in FIG. 1, noting that the term "solubility" is used herein to denote the combination of elemental sulfur and the carrier to form a liquid medium, regardless of whether the combination results in a chemical reaction or complexation between the sulfur and the carrier, or a simple dissolving of the sulfur in the carrier. FIG. 1 is a bar graph in which each bar represents the value of the slope of sulfur solubility vs. temperature for seven different solvents, all determined within the temperature range of −20° C. to +30° C. The two rightmost bars in this bar graph represent sulfur dioxide and ammonia, respectively, while the remaining bars represent carbon disulfide, benzene, toluene, cyclohexane, and heptane. The height of each bar indicates the solubility increase in ppm by weight of elemental sulfur per degree Celsius rise in temperature, i.e., the solubility-temperature coefficient. As the bar graph shows, all carriers have a positive solubility-temperature coefficient except ammonia, which has a negative coefficient, and sulfur dioxide has a positive but extremely low coefficient. The coefficients are as follows:

| | |
|---|---|
| $CS_2$ | 5,300 ppm/° C. |
| Benzene | 467 ppm/° C. |
| Toluene | 330 ppm/° C. |
| Cyclohexane | 249 ppm/° C. |
| Heptane | 111 ppm/° C. |
| Sulfur dioxide | 3 ppm/° C. |
| Anhydrous ammonia | −3,386 ppm/° C. |

Figure 2:
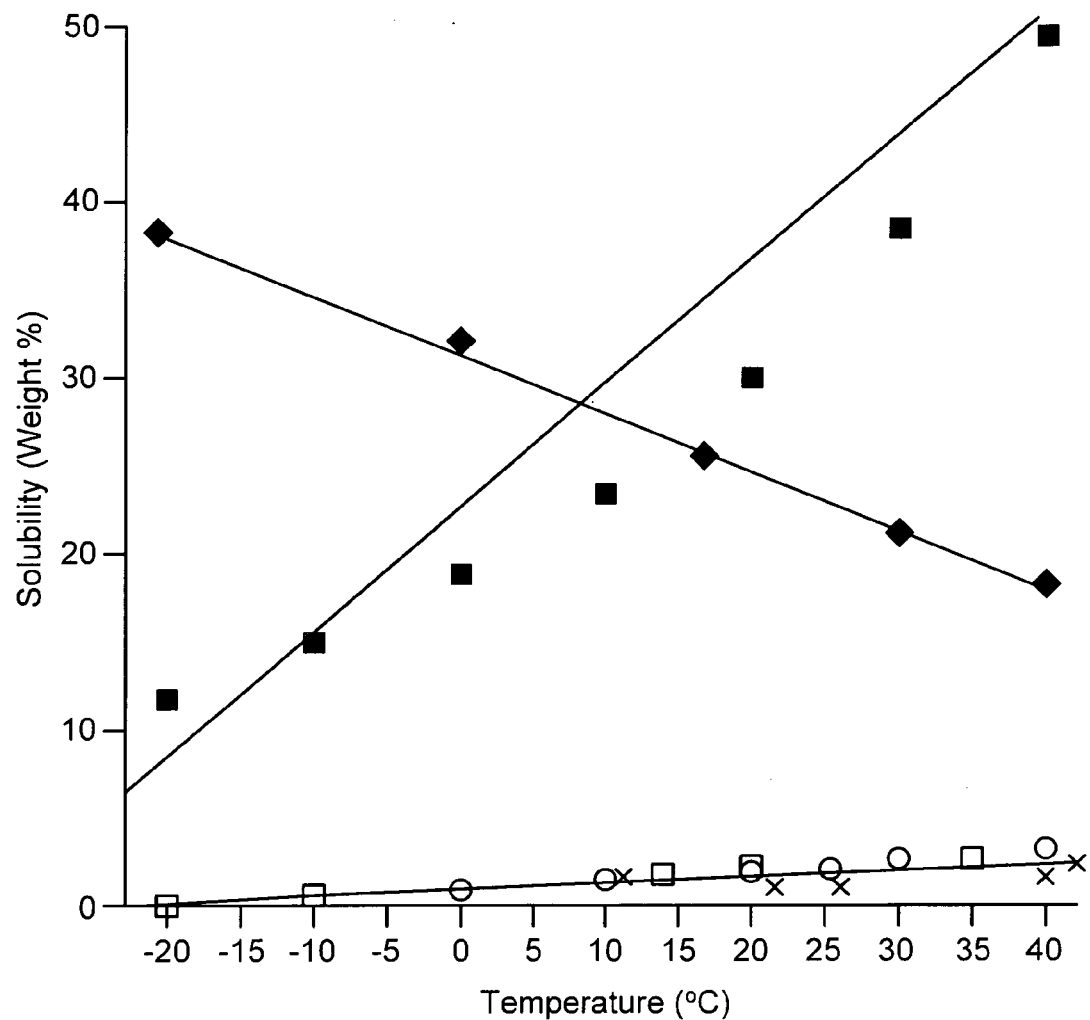
FIG. 2 is plot of sulfur solubility vs. temperature for solutions of sulfur in various liquid media, comparing anhydrous ammonia with organic liquids.

In embodiments of this invention that involve the use of anhydrous ammonia as a carrier, the discovery resides in the unusual and unexpected gross solubility characteristics of sulfur in anhydrous ammonia. In conventional carriers of the prior art such as carbon disulfide and various hydrocarbons, the solubility of sulfur increases significantly with increasing temperature, as shown in FIG. 2. The steep upwardly sloping line in the Figure represents carbon disulfide, and the lower line combines benzene (represented by open circles), toluene (represented by open squares), and cyclohexane (represented by x's). The downwardly sloping line represents anhydrous ammonia. This downward slope applies to a temperature range of from about −20° C. to about +40° C. At temperatures below −20° C., the solubility of sulfur in anhydrous ammonia is approximately constant at about 38 weight percent sulfur. Above −20° C., the solubility decreases steadily with increasing temperature, reaching approximately 20% at 35° C.

The data in FIG. 2 are shown in tabular form below together with data obtained using other liquid media as the carrier:

TABLE

Sulfur Solubility (in Weight Percent) in Various Liquid Media vs. Temperature (in Degrees Celsius)

| Anhydrous $NH_3$ | | $CS_2$ | | Benzene | | Toluene | | Cyclohexane | | Heptane | | Olive Oil | |
|---|---|---|---|---|---|---|---|---|---|---|---|---|---|
| ° C. | % | ° C. | % | ° C. | % | ° C. | % | ° C. | % | ° C. | % | ° C. | % |
| −20.5 | 38.1 | −20 | 12 | 0 | 1.0 | −21 | 0.38 | 11.1 | 0.72 | 0 | 0.12 | 15 | 2.2 |
| 0 | 32.3 | −10 | 15 | 10 | 1.3 | −10 | 0.576 | 22.2 | 1.02 | 25 | 0.36 | 30 | 4.1 |
| 16.4 | 25.6 | 0 | 19 | 20 | 1.7 | 13 | 1.52 | 26.1 | 1.09 | 35 | 0.51 | 40 | 6.2 |
| 30 | 21.2 | 10 | 23.5 | 25 | 2.1 | 20 | 1.83 | 44.2 | 2.02 | | | | |
| 40 | 18.5 | 20 | 30 | 30 | 2.4 | 35 | 2.72 | 40* | 1.8* | | | | |
| | | 30 | 38.5 | 40 | 3.2 | | | | | | | | |
| | | 40 | 50 | | | | | | | | | | |

*interpolated

It is also discovered that, contrary to the belief expressed in the prior art, the sulfur-ammonia solution does not contain discernable quantities of sulfur nitrides. Sulfur dissolved in anhydrous ammonia exhibits absorption bands at 580, 430 and about 295 nm. The intensities of the two bands at the shorter wavelength decrease with rising temperature while the intensity of the band at 580 nm increases with rising temperature. This indicates that at least two species of sulfur are present when dissolved in anhydrous ammonia. If, as suggested by the prior art, the ammonia and sulfur would react to form hydrogen sulfide ($H_2S$) and tetrasulfur tetranitride ($N_4S_4$), both would be separately observable in an absorption spectrum. Hydrogen sulfide dissolved in anhydrous ammonia exhibits a strong absorption band at 270 nm, a band that is missing in the absorption spectra of solutions of sulfur in anhydrous ammonia. Similarly, when $N_4S_4$ is dissolved in anhydrous ammonia a band appears at 254 nm and disappears over time, leaving a band at 360 nm due to the conversion of the tetranitride to an ammonia adduct of the dimer, i.e., $N_2S_2.NH_3$. Neither band is discernable in sulfur-ammonia solutions in accordance with the present invention.

Sulfur-ammonia systems in accordance with this invention include both liquid solutions in which all sulfur is in liquid form and no particulate sulfur remains, as well as slurries of sulfur in ammonia, or most often, in ammonia solutions that contain dissolved sulfur. Solutions and suspensions are collectively referred to herein as "fluid mixtures." The amount of sulfur contained in these fluid mixtures can vary and is not critical to the practice of the present invention. In most cases, however, best results will be obtained using systems in which the sulfur constitutes at most about 65% by weight of the fluid mixture, or preferably from about 20% to about 65% by weight, more preferably from about 40% to about 60% by weight, and most preferably from about 50% to about 60% by weight. When conveyed through a pipeline or any other vessel through which the fluid mixture passes, such as transfer tubing or piping for loading or unloading a static vessel such as a storage tank, a tank truck, a railroad tank car, or the hold of a ship, the temperature of the conveyance vessel is preferably 35° C. or less, and more preferably 20° C. or less.

As noted above, an application of the invention offering a particularly significant economic benefit is the transport of sulfur in ammonia by pipeline. Because of the negative slope of the temperature-solubility relation for sulfur in ammonia, the need for heating pipelines to maintain the flow of sulfur solutions or slurries is eliminated or greatly reduced, as is the need for extraordinary measures to address problems of corrosion. Furthermore, since sulfur and ammonia are both derived from natural gas, both the sulfur and the ammonia can be derived from the same source. Also, since sulfur and ammonia are both important raw materials at single-site fertilizer and phosphate operations, solutions or slurries of sulfur in anhydrous ammonia are an efficient and advantageous means of supplying these raw materials to such operations.

As noted above, the solubility of sulfur in anhydrous ammonia increases markedly as temperature declines. Crystals of sulfur that form near the cooler heat transfer surfaces of the pipeline system therefore dissolve preferentially over those in warmer regions. Thus, in the regions adjacent to normally cooler heat transfer surfaces anhydrous ammonia is a better solvent, and the sulfur concentration is further below the saturation concentration, than in regions that are removed from the heat transfer surfaces. When radiation heat losses occur at the external surface of the pipeline, particularly in the presence of diurnal effects, ammonia solution and slurry systems wash away any sulfur deposits from the internal surface. The external cooling of the pipeline can thus occur by radiation cooling in air, or by conductive cooling in air, in soil formations in the case of underground pipelines, or in water in the case of underwater pipelines.

When sulfur is either dissolved or dispersed in anhydrous ammonia, any solid phase sulfur that is formed as a sediment is tractable in nature, exhibits a soft-settle behavior and is neither sticky nor tar-like, but is instead easily re-dispersed after long periods of settling. The dissolved sulfur has an unusually low tendency to plate out or deposit on heat transfer surfaces, particularly as the vessel in which the solution or dispersion is retained is chilled down from ambient temperature.

The saturated liquid phase in a sulfur-ammonia slurry is near black-violet in color. When ammonia gas is slowly bled off to release pressure, the solid sulfur that remains changes color first to orange and then to greenish yellow or light tan, and transitory odors of sulfides and ammonia can be detected. Sulfur that is recovered in dry form from anhydrous ammonia solution is even brighter and lighter in color, and no sulfide odor is noticeable when handled by closed methods that minimize exposure of the mixture to air and moisture.

The use of sulfur dioxide as a carrier for elemental sulfur in accordance with this invention, while not demonstrating a negative solubility-temperature coefficient, provides as its benefit a very low rate of decrease in solubility with dropping temperature within the temperature range of from about −20° C. to about +35° C. The solubility of elemental sulfur in sulfur dioxide at −20° C. is extremely low and the rate of increase is approximately 3 ppm per degree Celsius of temperature increase. Accordingly, saturated solutions of sulfur in sulfur dioxide, if maintained at a temperature between about −20° C. to about +35° C. will not form sulfur deposits on vessel walls. At temperatures above 35° C., the solubility of elemental sulfur in liquid sulfur dioxide increases with temperature at a rate that is substantially higher than the rate observed at temperatures below 35° C. The incremental increase in solubility per degree Celsius at temperatures above 35° C. is generally in excess of 50 ppm, and typically between about 50 ppm and about 130 ppm. Because of this higher rate of increase, the sulfur in a saturated solution of sulfur in sulfur dioxide at temperatures above 35° C. will have a significant tendency to form deposits with small drops in temperature.

When maintained at a temperature within the range of about −20° C. to about +35° C., therefore, saturated solutions of sulfur in sulfur dioxide, or solutions that are slightly supersaturated, can be transported through pipelines, tank cars, and other vessels without plugging or other detrimental effects that accompany solids depositions, by simply maintaining the vessel at a temperature within this range. Such a vessel can thus be exposed to the widely varying ambient conditions that the transport vessels are typically exposed to or that may be encountered in the various environments through which sulfur must be transported to reach the destinations where sulfur finds its most economical commercial uses, with little or no risk of clogging due to temperatures at the wall that are lower than those in the bulk fluid. For this reason, the benefits afforded by the use of sulfur dioxide as a fluid conveyant for sulfur may in some cases be somewhat less than, but are generally similar to, those afforded by the use of anhydrous ammonia.

Sulfur-sulfur dioxide systems in accordance with this invention include both liquid solutions in which all sulfur is dissolved in the sulfur dioxide and is therefore in liquid form with no particulate sulfur remaining, as well as slurries of sulfur in sulfur dioxide, or most often, in sulfur dioxide solutions that contain dissolved sulfur. As in the case of sulfur-ammonia mixtures, sulfur—sulfur dioxide solutions and suspensions are collectively referred to herein as "fluid mixtures." The amount of sulfur contained in these fluid mixtures can vary and is not critical to the practice of the present invention. In most cases, however, best results will be obtained using systems in which the sulfur constitutes from about 1,800 ppm by weight to about 65% by weight of the fluid mixture, preferably from about 1% to about 60% by weight, or more preferably from about 10% to about 50% by weight. When conveyed through a pipeline or any other vessel through which the fluid mixture passes, such as transfer tubing or piping for loading or unloading a static vessel such as a storage tank, a tank truck, a railroad tank car, or the hold of a ship, the temperature of the conveyance vessel is preferably 40° C. or less, and more preferably 20° C. or less.

Included in this discovery are the facts that any solid phase sulfur that forms as a sediment in liquid sulfur dioxide is tractable in nature, exhibits advantageous soft-settle behavior, and is neither sticky nor tar-like, but is instead easily re-dispersed, even after long periods of settling. The sulfur has an unusually low tendency to plate out or deposit on heat transfer surfaces when mixtures are handled or maintained at temperatures below about 35° C., and in particular no tendency to plate out or deposit when the containment vessel is chilled down from ambient temperature.

Sulfur dioxide for use in forming sulfur/sulfur dioxide fluid mixtures can be formed by partially oxidizing sulfur or hydrogen sulfide by conventional methods, for example at a sour gas processing plant. The product sulfur dioxide is then shipped directly as a product or is mixed and fortified with elemental sulfur to produce a slurry of sulfur in sulfur dioxide. The solution or slurry is then transported by pipeline or other conventional means of liquid transport. The solution or slurry can be used to manufacture sulfuric acid directly, or separated by conventional techniques for industrial or commercial purposes. If premature sulfur deposition occurs on pipelines, the operator can switch the operation to an ammonia-based system to dissolve the deposits as described above. Hygroscopic salts form rapidly when anhydrous ammonia and anhydrous sulfur dioxide are brought into proximity in gas or liquid phase. In operations in which these salts are undesirable, methods well known to those skilled in the art can be used to minimize the contact between the ammonia and the sulfur dioxide.

In general, therefore, sulfur dioxide serves as an effective and efficient transport medium for elemental sulfur. In addition, the ability of sulfur dioxide to transport elemental sulfur so effectively affords benefits, heretofore unrealized, to hydrogen sulfide abatement operations by eliminating the need to consume valuable hydrogen by converting all of the sulfur dioxide back to elemental sulfur and wastewater. The yield of hydrogen gas can be increased by retaining all or a portion of the sulfur dioxide, or otherwise by producing a combination of sulfur dioxide and elemental sulfur, and transporting the sulfur dioxide and sulfur as a combination, by pipeline or otherwise, to a site where one or both can be put to economical and profitable use. Thus, in operations where the Claus process is employed, or any other process for $H_2S$ abatement that produces or may be made to produce both hydrogen gas and sulfur dioxide, the practice of this embodiment of the invention results in the production of as many as three useful products—hydrogen gas, elemental sulfur, and sulfur dioxide, with the hydrogen gas produced in a yield that is higher than that obtained in operations of the prior art.

Transport vessels in which the solutions or slurries of sulfur in either ammonia or sulfur dioxide can be conveyed in accordance with this invention can vary widely in dimensions, configurations and materials of construction. Due to the lower corrosiveness of these mixtures relative to solutions or slurries of the prior art, the transport vessels can be made of materials that are less inert to corrosive liquids and therefore less expensive than vessels that are designed to withstand corrosion. Glass-lined or specialty-resin-lined vessels, for example, are not required, nor are vessels constructed from special, highly corrosion-resistant alloys. Pipelines and other vessels having inner surfaces of a ferrous metal, such as steel alloys in general, can be used. As in the embodiments of the invention involving ammonia as a carrier, the benefits of the invention will be achieved in pipeline transports, regardless of whether the pipeline is in air, buried underground, or passing through a body of water. To minimize corrosion, the solutions or slurries of this invention are at least substantially anhydrous and preferably entirely anhydrous. Likewise, geologic formations from which sulfur is extracted or in which sulfur is stored in accordance with this invention are at least substantially water-free and preferably entirely devoid of water.

Figure 3:
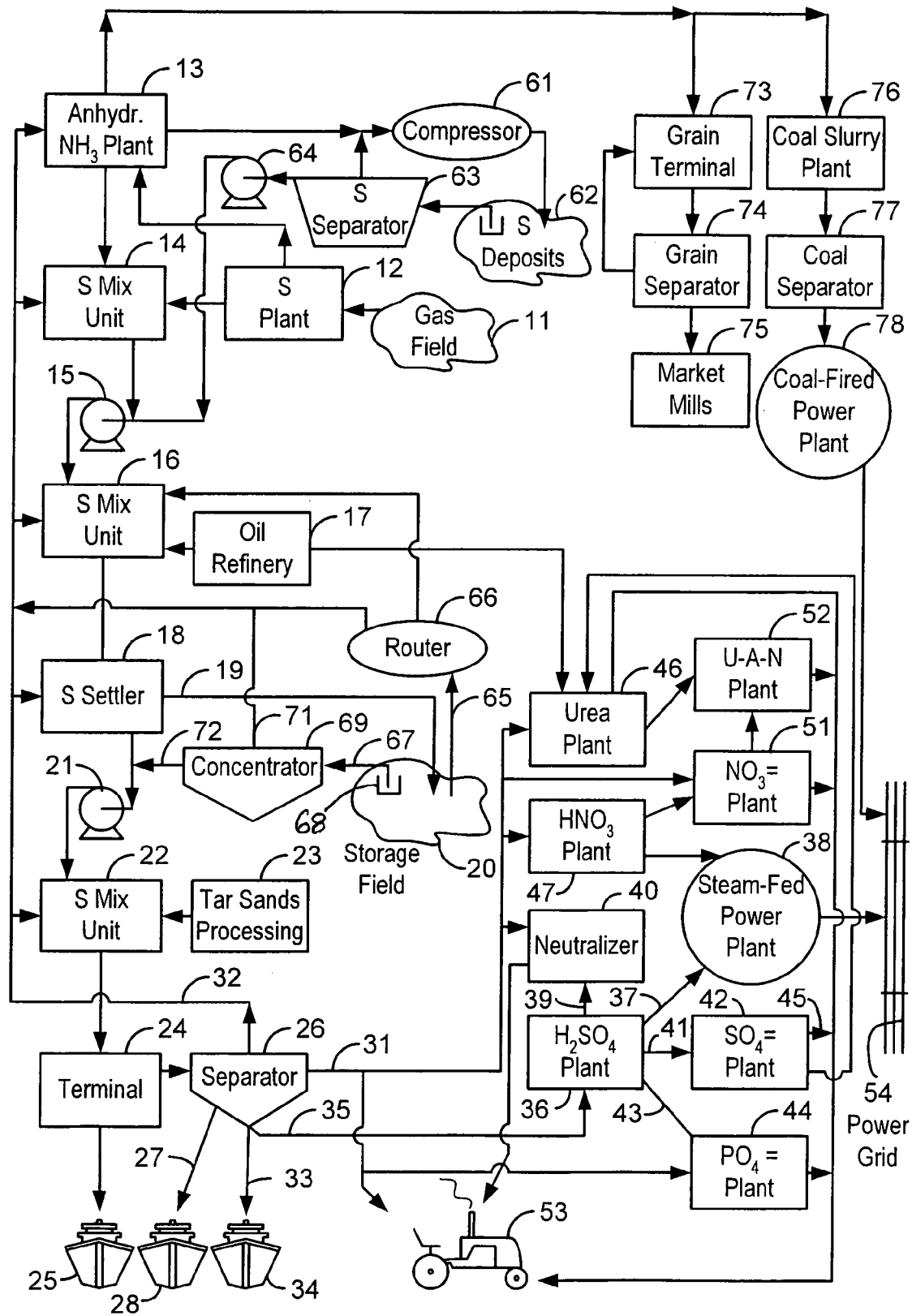
FIG. 3 is a process flow chart for a multi-operational scheme for processing raw materials from natural gas fields and native sulfur deposits, utilizing the principles of the present invention.

FIG. 3 is a flow sheet depicting one example of an implementation of some of the discoveries of this invention in operations in which anhydrous ammonia is used as a conveying medium for transporting energy, sulfur, and other commodities.

Raw natural gas from a natural gas field 11 is treated in a natural gas processing operation having a sulfur plant 12 to remove naturally occurring sulfurous contaminants, principally hydrogen sulfide, by well known methods to produce separate product streams of elemental sulfur, low quality steam or wastewater, and merchantable methane (natural gas). A portion of the decontaminated natural gas is fed to an anhydrous ammonia operation 13 where the natural gas is processed by well known methods of the prior art to produce feedstock hydrogen and by-product carbon dioxide in a ratio of at least five and one-half tons of $CO_2$ per ton of the required molecular hydrogen. The hydrogen so obtained is combined with atmospheric nitrogen by well-known methods to produce anhydrous ammonia. A portion of the anhydrous ammonia from the ammonia operation 13 is fed to a sulfur mix unit 14 where the ammonia is combined with sulfur from the sulfur plant 12 to produce an unsaturated solution of sulfur in ammonia. The unsaturated solution is sent via pipeline to a boost mixer 15, which is a combination mixing and pumping station. The boost mixer 15 also receives a slurry of native sulfur in anhydrous ammonia from operations that are described below, to produce a slurry of sulfur particles in a solution of sulfur in anhydrous ammonia.

The slurry from the boost mixer 15 travels by pipeline to a sulfur mix unit 16 which also receives elemental sulfur from a petroleum oil refinery 17 as well as recycle ammonia as and if required. The slurry from the sulfur mix unit 16 is routed downstream to a sulfur settler 18 where a portion of the liquid phase 19 of the slurry is decanted as a solution without suspended solids and fed to underground sulfur storage 20. The remaining slurry with a higher solids content is routed further downstream through a pumping station 21 to a sulfur mix unit 22. This unit receives additional by-product sulfur from a tar sands processing unit 23. The additional sulfur is blended with the slurry which is then pumped to a destination terminal 24.

At the destination terminal 24, a portion of the slurry is loaded into a tank ship 25 for shipment to offshore phosphate operations. The remaining slurry is sent to a separator plant 26. A portion 27 of the liquid phase of the slurry at the separator plant 26 is decanted and routed as a solution to another tank ship 28 that may for example supply the solution to agricultural sites for use as direct injection fertilizer.

At the separator plant 26, anhydrous ammonia is flashed off with compressors and the like, and routed downstream 31 for use as feedstock or upstream 32 for recycle. The ammonia can be sold in anhydrous form as a product at this point or it can be combined with water for sale or use as aqueous ammonia. The separator plant 26 also produces elemental sulfur 33 for shipping by a sulfur carrier 34 to world markets. Further elemental sulfur 35 is fed to a sulfuric acid plant 36 for use as feedstock. The acid plant 36 generates steam 37 without carbon oxides. The steam is routed to a steam-fed power plant 38. A portion 39 of the product sulfuric acid from the acid plant 36 is sent to a neutralizer plant 40, another portion 41 is sent to a sulfates plant 42, and a third portion 43 is sent to a phosphates plant 44. Sulfuric acid for sale is also available at this point.

At the sulfates plant 42, the sulfuric acid can be used to convert non-carbonaceous raw materials to products such as building materials or to various metal sulfate salts without generation of carbon oxides. When carbonate raw materials such as limestone are used, liberated carbon dioxide 45 is sent to a urea plant 46 as feedstock for producing urea, which is useful for enhancing forest and crop photosynthesis and various other uses involving the uptake of carbon dioxide. The phosphates plant 44 avoids the generation of carbon oxides by processing non-carbonaceous ore to manufacture phosphoric acid, ammonium phosphates, other phosphate products, and gypsum, used for building materials or long-term sulfur value storage.

Returning to the separator plant 26, ammonia 31 that is flashed off from the plant and sent downstream can be directed to any of various nitrogen operations including: (a) the neutralizer plant 40 where steam and ammonium sulfate fertilizer/soil amendment are produced, (b) an acid plant 47 that manufactures steam for the power plant 38 and nitric acid, and (c) the urea plant 46 that uses the ammonia and carbon dioxide from an oil refinery or from the sulfate plant 42. Another portion of this downstream-directed ammonia 31 from the separator plant 26 is sent to a nitrates plant 51 together with nitric acid from the acid plant 47 to make safety explosives and other nitrates. An urea-ammonium nitrate plant 52 makes urea ammonium nitrate solutions using feed from the urea plant 46 and the nitrates plant 51.

The products from these downstream plants 38, 42, 44, 51, and 52 are useful in manufacturing and agriculture 53. Electric power produced by the steam-fed power plant 38 supplies an electric power grid 54. The power plant can be a retrofitted carbon-fired unit and can earn for its operator air quality credits for elimination of previous carbon, sulfur, and nitrogen oxides emissions.

Returning to the upper left of the flow diagram, a portion of the ammonia from the anhydrous ammonia operation 13 is routed through a compressor 61 and down a well into native sulfur deposits 62. Dissolved elemental sulfur is pumped from a retrieval well to a sulfur concentrator 63. Anhydrous ammonia is flashed off from the concentrator 63 and recycled through the compressor 61 back to the well 62. Product slurry is sent from the sulfur concentrator 63 through a pumping station boost 64 to enter the pipeline system at the boost mixer 15.

Solution from the sulfur settler 18 is pumped into geologic formations at the storage field 19. At a predetermined solution loading, anhydrous ammonia 65 is flashed off underground and collected by gas wells through a compressor-router 66. When desired, stored sulfur is retrieved from the pores of the earth by sending fresh liquid anhydrous ammonia underground through the compressor router 66, recovering the dissolved sulfur mixture 67 through recovery wells 68, and directing the recovered mixture to a recover-concentrator 69. Anhydrous ammonia 71 is flashed off from the recover-concentrator 69 and recycled to various upstream units, including the anhydrous ammonia operation 13, the sulfur mix units 14, 16, 22, and the sulfur settler 18, while recovered slurry product 72 is sent downstream through the pipeline system.

The anhydrous ammonia operation 13 supplies ammonia to a grain terminal slurry plant 73 and the grain slurry is piped downstream to a grain separator 74 from which anhydrous ammonia is recycled to the grain terminal 73. Recovered grain is sent to market mills 75 or other commercial uses.

The anhydrous ammonia operation 13 similarly supplies ammonia to a coal slurry plant 76, and coal slurry from the plant is conveyed by pipeline to a coal separator 77 where the coal is separated from the ammonia and routed to a coal-fired power plant 78 supplying the power grid 54. Ammonia is recycled from the coal separator 77 back to the coal slurry plant 76.

To summarize the ways in which the present invention is implemented in this multi-operational process, the ability of the invention to transport sulfur-ammonia slurries through pipelines without clogging permits the transfer between the first two sulfur mix units 14 and 16 by way of the boost pump 15, the transfer from the sulfur concentrator 63 to the second sulfur mix unit 16 by way of the two boost pumps 64, 15, the transfer from the second sulfur mix unit 16 to the sulfur settler 18, the transfer from the sulfur settler 18 to the third sulfur mix unit 22 by way of the boost pump 21, and the transfer from the third sulfur mix unit 22 to the destination terminal 24. All units in the flow diagram are conventional in construction and operation.

Figure 4:
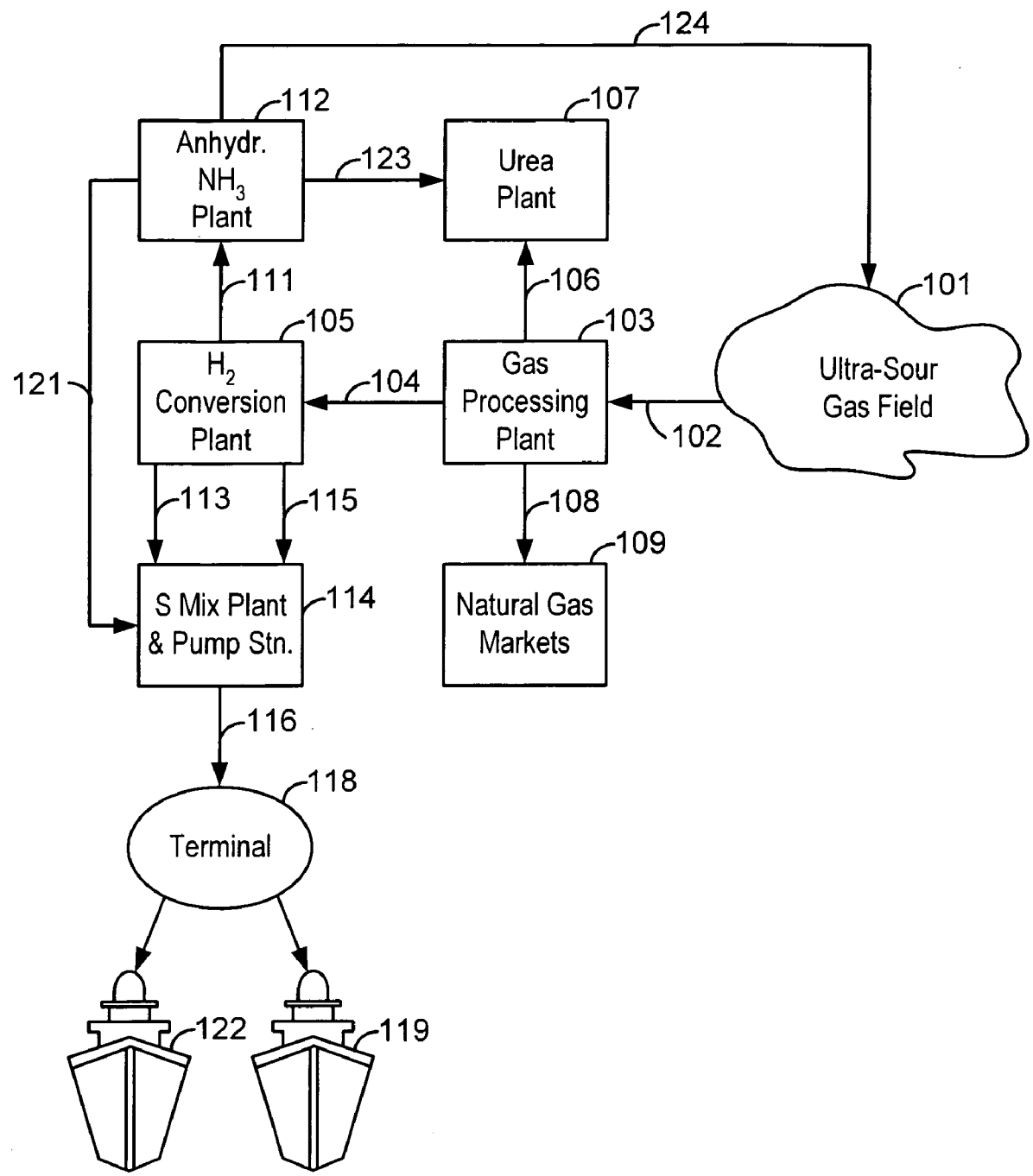
FIG. 4 is a process flow chart for a further multi-operational scheme for processing the gas from an ultra-sour natural gas field, utilizing the principles of the present invention.

FIG. 4 is a flow sheet depicting another example of an implementation of some of the discoveries of this invention, this time demonstrating the recovery of molecular hydrogen from a previously undevelopable ultra-sour gas field containing some raw natural gas with very high levels of hydrogen sulfide and carbon dioxide.

The gas field 101 supplies sour gas 102 to a natural gas processing plant 103 where hydrogen sulfide 104 is extracted from the gas and sent to a hydrogen conversion plant 105. The gas processing plant 103 also separates carbon dioxide 106 which is sent to a urea plant 107. Methane 108 is also separated at the gas processing plant 103 suitable for sale at natural gas markets 109. The hydrogen conversion plant 105 uses a carbonyl sulfide, modified superadiabatic, or thermal cracking process to produce a hundred thousand tons per year of molecular hydrogen 111, which is sent to an ammonia operation 112. The ammonia operation avoids consumption of a large proportion of its feedstock natural gas and receives negotiable environmental credits for about 550,000 tons per year of avoided carbon dioxide production. The hydrogen conversion plant 105 produces sulfur dioxide as well, half of which 113 is condensed and sent to a sulfur mix unit 114. The remaining sulfur dioxide is reacted with the fresh hydrogen sulfide feed to produce wastewater and elemental sulfur 115. The elemental sulfur 115 is sent to the sulfur mix unit 114 where it is combined with the sulfur dioxide to form a slurry containing approximately 60% by weight sulfur in sulfur dioxide slurry (80% total sulfur, 20% oxygen). The slurry is sent by a multi-modal slurry pipeline 116 to a water terminal 118 (i.e., a shipping port) where the slurry is exported by a modified tank ship 119 to offshore phosphate producers. A slipstream of sulfur dioxide can be diverted to wood products bleaching operations and the like.

The ammonia operation 112 uses the molecular hydrogen 111 as feedstock to produce ammonia. The ammonia can be sent by pipeline 121 to join the multi-modal slurry pipeline 116 at the sulfur mix unit 114 as a further fluidic conveyor for the sulfur slurry, and from there to the water terminal 118 where the resulting multi-carrier slurry is loaded on a tank ship 122 for export to offshore agricultural markets or phosphate producers. Alternatively, the ammonia can be routed 123 as raw material to the urea plant 107 or any other value-added nitrogen operation. A small slipstream of anhydrous ammonia 124 is also routed from the ammonia operation 112 to the ultra-sour gas field 101 where it is used to periodically dissolve and cleanse sulfur deposits from pipe interiors and other heat transfer surfaces.

The use of a pipeline in this operation thus permits both sulfur and sulfur dioxide to be transported as a slurry from remote locations to the water terminal 118 without the risk of clogging the pipeline. All units in the flow diagram are conventional in construction and operation.

The following examples are offered for purposes of illustration and are not intended to limit the scope of this invention. All percentages and other proportional amounts stated in these examples are on a weight basis unless otherwise noted.

EXAMPLE 1

This example illustrates the solubility and fluidity characteristics of mixtures of sulfur and anhydrous ammonia at different temperatures.

Representative models of transport vessels were fabricated from clear 19 mm polyvinyl chloride Schedule 40 or Schedule 80 pipe in appropriate lengths to provide a capacity of approximately 100 mL per pipe section. Each section was capped at one end by solvent welding and adhesive techniques and a ball valve was placed on the other end. Each vessel was weighed to establish its tare and then charged with liquid anhydrous ammonia. The mass of ammonia thus added was then determined and a predetermined amount of sulfur was placed in a separate vessel of the same construction. The ammonia and sulfur vessels were then joined through their ball valves, and the valves were opened to combine the liquid ammonia and sulfur which were then mixed by rotation, inversion, and agitation of each vessel.

By observation it was determined that mixtures in which the sulfur content was 50% and 60% by weight were very fluidic slurry mixtures at ambient temperatures at least below 68° F. (20° C.). At 65% by weight, the sulfur mixtures are also fluidic but exhibited significantly higher viscosity at similar ambient temperatures. At 70% by weight, the sulfur mixtures contained significant amounts of powder that had very limited, if any, fluidity at temperatures from about 32° F. (0° C.) to at least 68° F. (20° C.). With due caution, the fluidity of the 70% by weight sulfur mixture was improved noticeably by chilling the mixture in a dry ice bath.

EXAMPLE 2

This example illustrates the pumping of solutions and slurries of sulfur in liquid anhydrous ammonia in a bench-scale model.

A bench-scale piping circuit was made from 19 mm diameter steel and transparent PVC pipe having a total circuit length of approximately 4 meters. The circuit contained a small pump and a ninety-degree downward angled steel U-joint of about 0.9 meter with a drain valve. The U-joint was placed at mid-circuit from the pump and was attached with appropriate isolation valves and detachable close couplings below the isolation valves. Three separate standing pipe sections were attached as Tees extending vertically upwards from the main circuit. These standpipes were placed at regular intervals between the pump and the downward U joint on one side of the circuit. The standpipes were 15 cm to 25 cm in height. The standpipe closest to the pump was fitted with a valve attachment leading to a vacuum pump. The second standpipe was fitted with a commercial ammonia temperature and pressure gauge. The last standpipe was fitted with a 19-mm ball valve. The return line from the U-joint to the pump was a 1.5-meter section of welded steel 19-mm pipe and a small section of clear PVC pipe. A 50-mm diameter PVC cooling water jacket with inlet gate valve was fitted to about 1.3 meters of the 1.5-meter steel return line. One 19-mm ball valve was placed between the pump and first standpipe. The entire system was firmly attached to a tip board 1.8 meters in length and the standpipes were braced.

The system was cleaned and repeatedly rinsed with distilled water and vacuum pumped dry. The system was able to hold a nominal vacuum of −30 inches Hg. The system was further pressure tested with ammonia, which was introduced as a saturated gas phase from the valved U-joint drain or from a manifold at the vacuum standpipe. Several small diameter punchings of white high-density polyethylene were made and added as visual markers to better monitor the velocity of the conveyant. These markers were placed in the circuit through a standpipe and the system was returned to a nominal −30 inches Hg.

An excess volume of sulfur solution and slurry in anhydrous ammonia was prepared, using a matching pair of pressure-rated pipe receivers fabricated from 50 mm pipe, each receiver being approximately 80 cm in length, capped at one end with a 19-mm threaded reduction bushing with a threaded plug and at the other end with a 19-mm threaded reduction bushing and a 19 mm×6 cm threaded steel nipple. All threaded attachments were appropriately sealed with commercial thread compound that was rated for gas and pressure and deemed compatible with both steel and plastic fittings. A compatible 19-mm female threaded ball valve was fitted to the nipple on each receiver. An additional threaded nipple was attached to one of the valves for later interconnection with the other receiver.

One receiver was vacuumed, tared, and charged with liquid ammonia and weighed. About 830 grams of ammonia were transferred to the receiver as condensate from a commercial cylinder using an ice bath. About 830 grams of previously desiccated powdered bright sulfur 100% with a mesh size of minus 1/32 inch was rapidly transferred to the other previously vacuum-dried receiver. The valve was closed and the two receivers were attached to each other with the threaded nipple previously attached. The two valves on the receivers were adjacent. The liquid ammonia receiver was placed above the sulfur receiver. Both valves were opened and ammonia was allowed to flow for a period of several minutes to fill the lower sulfur-containing receiver while the upper receiver was severely chilled. Completion of the transfer was facilitated by the application of mild heat to the upper receiver by careful use of a heat gun or hair drier.

After several minutes and when the upper receiver was no longer severely chilled, the lower valve was closed. The two attached receivers were inverted and retained material was allowed to drain from the second valve and nipple. The valve was then closed. The receivers were detached very carefully in a fume hood or out of doors. The connection was unscrewed to slowly release the ammonia pressure while wrapped with shop towels to avoid spraying. A momentary intense odor and violet-to-black fluid changing to yellow-green powder was noted on the towels.

The full or nearly full sulfur and ammonia receiver was further end-capped and the valve handle was safety secured in the closed position with plastic. This receiver was now an easily agitated tip pipe containing an approximately 50% mixture of solid phase and dissolved sulfur by weight in 50% by weight anhydrous ammonia. The solid-phase precipitate was manageable and rather easily re-dispersed in a matter of a few minutes by either rolling the pipe vessel or repeatedly inverting it end for end to induce flow even when the vessels had been left undisturbed for periods of more than ten days.

The ammonia and sulfur receiver was agitated by repeated inversion and rotation for 15 minutes. The receiver was then rapidly attached to the valved standpipe above the pipe circuit under vacuum. Both valves were rapidly opened and the pipe circuit was charged with the mixture. The tip board was lifted and lowered several times rapidly from one end to eliminate bubbles and fully charge the system. The cooling water flow was started, the pump was started and the system was further degassed under rapid flow. The valves between the sulfur/ammonia vessel and standpipe were closed and opened a few times. The upper vessel was mildly, evenly, and carefully heated over a period of three minutes while dark blue to violet fluid continued to drain to the main circuit. Both valves were then closed. The control valve was slowly partially closed so the fluidic velocity was approximately 150 cm per second by observation of the white polyethylene markers through previously measured and marked pipe sections.

The cooling water gate valve was opened further and adjusted to an equilibrium temperature of about 48° F. (9° C.) as indicated on the ammonia gauge. The ambient air temperature was 41° F. (5° C.) with a moderate breeze. The pump was stopped after two hours. The U-joint isolation valves were closed. The U-joint was drained through the drain valve to a previously vacuumed pipe receiver for recycle or re-use.

The U-joint was decoupled and inspected while taking care to avoid spraying. No deposition or scale were evident although random exfoliated crumbs of yellow green sulfur were present. A loose powder coating of yellow-green sulfur dust was noticeable with some highly reflective crystals on the steel pipe walls. The U-joint was gently tapped with a small wrench and loose sulfur powder and crumbs were dropped out of the joint. The remaining sulfur dust was gently blown out with compressed air. The U-joint was dried thoroughly to a stable baseline weight of 1492.5 grams.

An intensely colored violet maroon black residuum remained in the pipes throughout the system at a depth of approximately one-third of the diameter. Gaseous ammonia at about 60 pounds per square inch was slowly bled off into water for use as fertilizer. As the pressure was reduced the color of the residual sulfur changed from dark maroon to orange and to orange-fringed tan over time. When the active bleed-off activity was nearly over, the system was vacuum pumped down to −30 inches Hg over about one hour. The color of the sulfur bed further lightened to a light tan powder. The vacuum was then released.

EXAMPLE 3

This example presents a prospective illustration of a slurry pumping method, a solid sulfur storage method, a solid sulfur recovery method, and further screening experiments for shale oil, crude oils, coal, grain, and tar sands.

The dropping funnel method of transferring slurry to the pipe system described in Example 2 can be replaced with a valve-in-head cartridge filter container without the interior filter cartridge, placed in-line with a by-pass circuit. Sulfur can be loaded separately in the filter container and ammonia charged separately. At an appropriate time the ammonia is washed into the sulfur and thence into the circuit either as a slurry or as a simple solution. An in-line baffled static mixer and a paddle wheel flow indicator can also be used. The tendency of the system to form deposits can be determined by a steel tube dipped into an agitated slurry vessel while running a cold or hot heat transfer fluid through the tube.

To investigate applications of this invention to mining, storage and retrieval of sulfur, a modified ammonia refrigeration circuit with a compressor and anhydrous ammonia reservoir/boiler can be used. A mass transfer circuit analogous to a high pressure liquid chromatography apparatus can be placed in-line on the outlet high pressure/hot side of the compressor to direct liquid-phase neat ammonia or solutions (rather than slurries) of sulfur in ammonia into a column or pipe. Retrieval piping can be directed back to the ammonia reservoir/boiler. A flow restrictor/meter valve can be placed just upstream of the column or downstream at the entrance to the ammonia boiler. A gas expansion valve and reflux section may be required leading from the boiler to the inlet low pressure/cool side of the compressor. A condenser can be placed upstream of the column and downstream of the compressor outlet. A valved drain with or without a heater can be installed in the lowest section of the ammonia boiler.

A mining or storage inventory retrieval operation can be modeled by loading the column with molten sulfur and cooling the loaded column while allowing for expansion on solidification. A borehole of predetermined diameter and depth may be drilled into the sulfur bed. As an example, a small diameter pipe surrounded coaxially with a larger diameter pipe is placed into the borehole. The small diameter pipe is attached to the liquid ammonia feed from the condenser. The large diameter external pipe is routed to the ammonia boiler. The sulfur bed and above piping are enclosed within a sealed exterior large-diameter pipe. A simple steel Tee fitting can be drilled with an appropriate hole for the small pipe above and opposite the downward facing Tee leg (connecting to the larger coaxial surround pipe). One arm of the Tee will lead to the boiler as above while the other arm can be plugged or fitted with instrumentation.

A closed system can be modeled by drawing a vacuum on the column, then charging and pressurizing the column with anhydrous ammonia from the boiler drain valve. The compressor can charge the condenser and thereby force liquid into the solidified elemental sulfur bed to contact, wet, and dissolve elemental sulfur. Dissolved solids in ammonia solution are forced up the exterior coaxial pipe and are routed to the boiler. The compressor pulls gaseous ammonia from the reservoir/boiler, thereby concentrating the sulfur and recycling the ammonia for condensation and re-use to dissolve and transport more sulfur from the bed within the column.

To use the column as a model for sulfur storage, the column is rebuilt as a geologic formation containing porous minerals such as sand or infusorial earth. A by-pass circuit with a sulfur ammonia solution reservoir is located between the compressor outlet and the column. The system is charged and brought on line with a neat anhydrous solvent ammonia cap, followed by ammonia sulfur solution, followed by a neat ammonia chaser. At an appropriate time, the operation is switched to place the column under reduced pressure (vacuum), and gaseous ammonia is withdrawn from the column for recycle, thereby depositing solid elemental sulfur for storage in pores of the earth within the column but remote from the introduction point owing to the action of the chaser. The column piping may be modified with, for example, perforation zones to better place and deposit the sulfur and retrieve ammonia. The placement and recovery piping can be configured with one or more pipes (wells) and a variety of recovery well arrays can be employed. Recovery of the thus stored sulfur is accomplished by purging the formation with ammonia as in the mining case.

Slurries or solutions that are recovered as described above can be sold as commodities. Molten sulfur can also be prepared for sale as a commodity by using a bottom heater to melt the accumulating sulfur as it precipitates while driving off ammonia at near its critical temperature. The melted sulfur can be removed through a heated drain valve.

EXAMPLE 4

This example illustrates the solubility and fluidity characteristics of mixtures of sulfur and sulfur dioxide at different temperatures.

Sulfur dioxide was prepared by reaction of sulfuric acid with sodium sulfite, under conventional reaction conditions for this reaction, and collected at −20° C., redistilled twice from ambient temperature at saturation pressure, and collected in a flask in a cold bath. No moisture was observed at the −20° C. collection temperature.

Finely powdered sublimed flowers of elemental sulfur USP were desiccated for several days over concentrated sulfuric acid. Tare weights were determined for thick-walled vials equipped with PTFE seals and threaded closures, and the sulfur was transferred to these vials and weighed. The closed vials were then chilled to −20° C. in a salted ice bath. The liquid sulfur dioxide was chilled to the same temperature in a closed vessel and rapidly transferred to the sulfur-containing vessels. Both vessels were then rapidly recapped to prevent escape of gaseous sulfur dioxide. The resulting mixture contained 1.8 parts of sulfur dioxide to 1.0 part of elemental sulfur, or 35.7% elemental sulfur by weight.

Further observations were made as follows:

The sulfur/sulfur dioxide slurry was highly fluidic, tractable, and bright yellow in color.

Excess powdered sulfur was easily dispersible even when allowed to settle over seven days. The precipitated excess sulfur was a slow-to-drop, soft-settle, non-caking redispersible mass below a layer of clear supernatant liquid.

Over a period of ten days, no plating out of sulfur particles or adherence of solid sulfur to heat transfer surfaces was observed, nor was agglomeration, tarring-out, or polymerization of sulfur particles observed. During this ten-day period, the slurry was intermittently handled and stored at temperatures varying between −20° C. and +37° C. and twice subjected to severe chill of about −70° C. for short periods.

A test vessel having a volumetric capacity of approximately 10 mL was filled to approximately half its volume with the suspension of sulfur in liquid sulfur dioxide. Upon vigorous agitation of the vessel, a fairly homogeneous powder coating of elemental sulfur formed on the interior surface of the vessel both above and below the liquid level and over the entire interior surface including head space. The powder coating was easily washed off by simple, gentle rotation of the vessel, to leave a clean, uncoated surface. Removal of the coating in this manner continued to be possible over more than ten days. The solid phase excess sulfur remained bright yellow in color over temperatures ranging from about −70° C. to about +37° C. without plating out or adhering to the interior vessel surface.

EXAMPLE 5

This example illustrates the solubility and fluidity characteristics of a sulfur particulate fraction different from that of the previous example, and the solubility and fluidity characteristics of sulfur dioxide that had been obtained from a commercial source and further treated.

A known quantity of sulfur dioxide was prepared from a commercial lecture bottle by bubbling the gas through concentrated sulfuric acid to remove trace quantities of sulfur trioxide gas. Liquid sulfur dioxide was collected by condensation in a cold bath.

Elemental sulfur was prepared by melting sublimed flowers of sulfur U.S.P. in an inert atmosphere by conventional means and the sulfur was allowed to recrystallize upon cooling to block form. The resulting hard solid sulfur was pulverized with some difficulty, and various screen fractions were taken. One screen fraction in particular consisted of 100% through 0.7 mm square-hole woven mesh and 100% on 0.5 mm square-hole mesh and was desiccated over concentrated sulfuric acid.

Slurry mixture samples having known quantities of the elemental sulfur particulate fraction and the liquid sulfur dioxide were carefully and rapidly prepared by conventional means in pressure-rated thick-walled vials having threaded phenolic closures and PTFE seals. In particular, a sample containing about 65% by weight particulate sulfur in liquid sulfur dioxide exhibited fluidity for more than seventy days.

Further observations were made as follows:

The fluidic sulfur/sulfur dioxide slurry was tractable and light yellow to light tan in color and remained so for more than seventy days.

The excess particulate sulfur remained easily dispersible even when allowed to settle for ten days. Excess sulfur particles dropped rapidly from liquid suspension but remained a non-caking and easily dispersible mass below a thin layer of transparent supernatant liquid even when allowed to settle for a further six weeks.

The sulfur particles remained resilient and non-friable when subjected to periodic vigorous agitation after sixty days with little diminution in size and with very few crystalline fines resulting from agitation. No discernable plate-out of sulfur or crystals adhering to the vessel surfaces occurred throughout the entire period of these observations.

EXAMPLE 6

This example illustrates the solubility characteristics of mixtures of sulfur and sulfur dioxide under more severe temperature conditions.

Solubility behavior was investigated in test vessels that were representative models of transport vessels suitable for higher temperature handling. The conditions were similar to those encountered in pipes and other vessels during unit operations, such as pumping stations, separators, slurry mixers, and the like, including conditions of high temperature and pressure. Because of the anticipated blast and inhalation hazards, threaded thick-walled cylindrical glass centrifuge vials having conically shaped interior cavities of approximately 0.25 mL capacity were used as the test vessels. Threaded phenolic closures were drilled through and fitted with PTFE blow-out discs as pressure relief seals.

Accurately weighed samples of very fine powdered desiccated elemental flowers of sulfur U.S.P. were placed in the vessels and then closed and chilled in dry ice/solvent Dewar beakers. Liquid sulfur dioxide was prepared and redistilled twice, as in Example 4 above. At convenient times the sulfur dioxide was chilled in dry ice/solvent. The sulfur dioxide vessel was then removed from chill and rapidly fitted with PTFE micro-tubing through a rubber sleeve stopper. The sulfur dioxide was allowed to warm gradually until a good flow of gaseous product was observed at the tubing outlet when it was placed within the chilled sulfur vessel where it was allowed to condense and fill the sulfur vial (care being taken to allow sufficient head space to prevent hydrostatic bursting from liquid sulfur dioxide expansion). With care being taken to prevent contamination from ice the vessels containing sulfur and sulfur dioxide were closed and allowed to warm to ambient temperatures. Sulfur and sulfur dioxide content quantities were then determined by means of an analytical balance affording representative models of transport vessels containing thus determined known concentrations of elemental sulfur in liquid sulfur dioxide liquid under pressure.

A heated water bath, thermometers, and 14× magnifier were then employed using known methods and conventional means to determine actual equilibrium saturation concentration temperatures and temperature vs. solubility relationships for sulfur in sulfur dioxide. With many iterations as to predetermined concentrations and numerous heating and cooling cycles with due caution for shrapnel and adequate ventilation, the following observations were made:

Sulfur dissolved in liquid sulfur dioxide at a concentration of 134 ppm±20% (by weight) at a temperature of 35.5° C.±3° C.

Sulfur dissolved in liquid sulfur dioxide at a concentration of 878 ppm±10% at a temperature of 47.3° C.±1.3° C.

During heating of these solutions to approximately 85° C. with agitation followed by gradual cooling to ambient temperature in a water bath, no crystals adhering to the interior vessel walls were observed. Instead, long, free-floating, transparent, faintly yellow needle crystals of sulfur precipitated out of solution at both 35.5° C. and 47.3° C., as previously disclosed.

The formation of intractable vessel sidewall deposits of sulfur was induced during attempts to dissolve higher concentrations of sulfur by agitation over longer periods at somewhat higher temperatures. For example, in test runs using predetermined sulfur concentrations of about 1800 ppm in sulfur dioxide, the element could not be completely dissolved with good agitation over several hours at temperatures approaching 96° C. Although some runs failed due to blown pressure relief seals, plating out and side wall deposition of solid sulfur were observed on successful attempts when they progressed enough for gradual ambient cooling of the sample (containing some still undissolved solids) in the water bath. The sulfur plating and deposits were particularly evident on and near interior surface imperfections. Those deposits could not be removed with vigorous agitation of the contents over a time period of about an hour.

The rate of change of sulfur solubility in liquid sulfur dioxide per one degree change in temperature Celsius is very small in the temperature range below about 35° C. Within the limits of experimental error, the rate of change was 2.5±0.6 ppm per degree Celsius. The rate of change increases very significantly at temperatures above about 40° C. Within the range of about 40° C. to about 100° C., the rate appears to reside in the range of 50 to 130 ppm per degree Celsius.

As in the representative models, transport vessels such as piping for sulfur in liquid sulfur dioxide should be maintained at modest practical temperatures below about 40° C. to eliminate or avoid premature deposition of sulfur on heat transfer surfaces. Events such as high temperatures and solvent flash-off can be managed by conventional engineering controls such as insulation, non-cavitating pumps or mixers, and the like, to avoid solids deposition.

EXAMPLE 7

This example illustrates the solubility of larger elemental sulfur particles in liquid sulfur dioxide at various temperatures using alternative methods and materials to confirm the results reported in the examples above.

A screen fraction of elemental sulfur that had been recrystallized and pulverized, the fraction being 100% through 0.5-mm square-hole mesh, was further carefully classified, sorted and separated by hand with magnification to produce about one hundred very similarly small-sized hard resilient sulfur particles. The particles were desiccated over concentrated sulfuric acid and carefully weighed both in the aggregate and separately to assure nearly equal weights of 200 micrograms per particle.

An array of about ten thick-walled conical-cavity vials with phenolic threaded closures having PTFE seals were dried and carefully tared, and various weights of the above particles were placed in each vial. Total predetermined sulfur weights thus ranged from 200 micrograms to 2,000 micrograms per vial.

Fresh liquid sulfur dioxide was prepared by bubbling sulfur dioxide gas from a commercial lecture bottle through concentrated sulfuric acid while condensing and collecting the liquid sulfur dioxide in a cold receiver. The prepared vials containing the known weights of elemental sulfur particles were then chilled and rapidly filled with the prepared cold liquid sulfur dioxide and capped while maintaining sufficient headspace for anticipated expansion. Total weights were then determined by analytical balance, the resulting samples having about 30 ppm, 50 ppm, 70 ppm, 100 ppm, 150 ppm, 190 ppm, 240 ppm, and 540 ppm, respectively, by weight of sulfur in liquid sulfur dioxide under saturation pressure. The samples were arranged together for long-term mild agitation at a temperature of about 20° C. with periodic inspection. The results were as follows:

At 30 ppm, the sulfur completely dissolved in the sulfur dioxide in one day.

At 50 ppm, the sulfur completely dissolved in the sulfur dioxide in two days.

At 70 ppm, the sulfur completely dissolved in the sulfur dioxide only after one week.

All other samples, having higher contents of elemental sulfur, remained substantially undissolved even after ten days.

The dissolved samples containing 30, 50 and 70 ppm sulfur in sulfur dioxide were then placed in melting ice at 0° C. for twelve hours at which time discernable quantities of precipitated sulfur were observed in each vial.

The samples containing 100 ppm or more of elemental sulfur in liquid sulfur dioxide were transferred to a constant temperature bath at 35° C. and held at that temperature with constant mild agitation. The sample with 100 ppm sulfur completely dissolved after two days. After an additional three days, none of the samples containing 150 ppm or more elemental sulfur had completely dissolved. An attempt to characterize solubility at higher temperatures resulted in the expected bursting of samples due to excessive saturation pressures.

To summarize, this example demonstrates that sulfur particles were dissolved at low concentrations by liquid sulfur dioxide over the temperature range from about 0° C. to 35° C. By this method the solubilities of elemental sulfur in liquid sulfur dioxide at saturation pressure were shown to be below 30 ppm at 0° C., from about 50 ppm to about 100 ppm at 20° C., and from about 100 ppm to 150 ppm at 35° C. These observations indicate that the solubility-temperature coefficient for elemental sulfur in liquid sulfur dioxide over the range from 0° C. to 35° C. is less than 5 ppm per degree Celsius change in temperature and apparently within the range of 2 to 4 ppm per degree Celsius, in good agreement with the conclusion of Example 6 above, i.e., 2.5±0.6 per degree Celsius.

EXAMPLE 8

This example illustrates a sulfur transport method to model multiple operating modes for sulfur in different conveying fluids, compares results for sulfur deposition on heat transfer surfaces when different conveying fluids are used, and illustrates how sulfur deposits can be cleaned and removed using liquid anhydrous ammonia.

As a representative model of pressure-rated transport vessels, a section of thick-walled glass pipe with closed bottom end was used that was capable either of immersion in a water bath or of fitting with an exterior resistance heater and magnetic stirring. A machined aluminum dual-ported bolt-on top bulkhead closure was fabricated and through-bulk-head fittings were attached that were suitably pressure-rated and that allowed passage of a small diameter bottom closed-end stainless steel tube into the pipe to serve as a closed probe with an opening outside and above the bulkhead. An even smaller diameter open-ended tube was then fitted inside the probe with sufficient clearance for passage of heat transfer fluids. This smaller-diameter tube had one opening inside and near the bottom of the probe and the other open to the exterior. The assembled probe was placed in the vessel in a manner that allowed convenient disassembly and inspection and that allowed heat transfer fluids to circulate within the probe tubing but separate from the model transport vessel contents. Additional tubing was fitted to the vessel heat transfer fluid probe inlet, leading to the outlet of a small submersible pump placed in an insulated variable temperature heat transfer fluid container. Heat transfer fluid return tubing was fitted to the probe outlet and led back to the heat transfer container. The other port of the bulkhead top closure was used for a partial immersion thermometer or pressure valving with a pressure gauge to monitor equilibrium temperatures (or saturation pressure) of the sulfur/conveying fluid mixtures within the pipe section.

Model vessels prepared in this manner were thus designed to receive slurries of sulfur in various conveying fluids and to control the temperature of the slurries by the bath or by a resistance heater. Each vessel was also designed to provide agitation and to allow heat transfer fluid to be pumped through the heat transfer fluid probe until the desired equilibrium conditions were established. When sulfur deposition occurred prematurely on the exterior heat transfer surface of the immersed probe, this deposition was capable of determination under selected conditions as to temperature, pressure and time, by measurement or weighings. The vessels allowed comparisons between various fluidic sulfur conveyors including anhydrous ammonia, light amines, sulfur dioxide, hydrocarbons, or petroleum fractions, as desired. Metal corrosion coupon tests were performed in the various slurry varieties with or without introduced contaminants such as water, oxygen, chloride ion, and the like by placing coupons within the agitated vessel while operating the vessel under predetermined and comparable conditions as to temperature, pressure, or duration. Suitable operating conditions and materials of construction were thus determined and modeled for piloting or commercial field use.

In one set of three different comparative experimental runs using very fine sublimed flowers of sulfur U.S.P., sulfur slurries containing 10% by weight sulfur were prepared using toluene, cyclohexane, and liquid sulfur dioxide, respectively. In each run, melting ice water was used as the heat transfer fluid with a pump inlet temperature of about 0.5° C. and a heat transfer probe throughput flow of about 110 mL per minute. A 44-watt resistance heater was partially wrapped around the model vessel and operated at full power with periodic adjustment of the wrapping coverage during the runs to maintain a constant temperature of the sulfur/conveyor mixtures of about 20° C. An egg-shaped magnetic stir bar and magnetic plate stirrer were used to mix and agitate the slurries on a slow setting. A partial immersion thermometer was used for the toluene and cyclohexane runs and a pressure gauge was used in the sulfur dioxide run. In each case, equilibrium temperature conditions were quickly established in less than ten minutes with stirring and the temperature of the vessel contents was maintained at about 20° C. over three hours, care being taken to control the mixture temperature to avoid heat build-up as sulfur deposits began fouling of the heat transfer probe exchange surface in the toluene and cyclohexane runs.

At the end of each three-hour run the probe was inspected with following results. When toluene was used as the fluid carrier, a 2.1 mm thick coating of crystalline solid sulfur completely surrounded the probe. The partial immersion thermometer proximately located separately in parallel with the heat transfer fluid probe exhibited no sulfur deposits. After drainage and drying by vacuum, the sulfur was quickly removed with fresh liquid anhydrous ammonia with very mild agitation. When cyclohexane was used as the fluid conveyor, a 0.6 mm thick coating of solid sulfur appeared within three hours, completely surrounding the probe. No sulfur deposits appeared on the thermometer. The probe sulfur coating was likewise easily cleaned from the surface after drainage and drying using fresh liquid anhydrous ammonia. In the run utilizing pressurized liquid sulfur dioxide as the liquid conveyor, no discernable deposits of sulfur appeared on the heat transfer probe over the course of the three-hour run under the same conditions. In all three cases the temperature rise of the heat transfer fluid (ice melt water) returning to the container did not exceed 2° C. throughout the duration of the run. Sulfur dioxide was thus shown to be an advantageous fluid carrier to avoid sulfur deposition on cooler heat transfer surfaces.

Another set of experimental runs was performed using two grades of liquid anhydrous ammonia to compare with the above-described experiments and to determine the effect of moisture contamination on ammonia as the liquid conveyor. Refrigeration-grade ammonia having a moisture content of less than 200 ppm by weight was compared to agricultural grade anhydrous ammonia having a moisture content of 3000 ppm by weight. In each case, very fine sublimed flowers of sulfur U.S.P. were used to prepare 30% by weight sulfur mixtures in the vessel. Refrigeration grade ammonia was used in the first run and agricultural grade anhydrous ammonia prepared by adding 2800 ppm of water to refrigeration grade material was used in the second. Since the solubility of sulfur in ammonia is approximately 20% in this temperature range, the 30% loading was selected to achieve an undissolved elemental solids loading of about 10% by weight, equivalent to that used in the first set of runs reported in this example. Exceptional caution was required due to the higher pressure, i.e. about 110 psig, that was required to replicate the desired equilibrium fluid mixture temperature of 20° C. Safety measures including shrapnel protection were deployed. In one instance, glass pipe fracture at the bolt-on bulkhead was induced at test pressure of about 150 psig. All other conditions of the previous example were duplicated except that a strong back light was required to observe the mixtures owing to their intense violet black coloration.

At the end of both three-hour runs and by inspection, the heat transfer fluid probe exhibited a discernable but very fine light dust coating of sulfur crystals following drainage and drying. The thickness of the dust build up was not measurable and may be an artifact of evaporating solvent ammonia at the end of the runs. The sulfur recovered from the refrigeration grade ammonia with its lower moisture content was greenish tan in color after drying. The sulfur recovered from the agricultural grade ammonia with its higher moisture content was a lighter-colored tan to yellow after drying.

This example thus demonstrates that liquid anhydrous ammonia having a moisture content typically encountered in commercial practice is an advantageous fluid carrier for elemental sulfur mixtures to avoid sulfur deposits on cooler heat transfer surfaces.

EXAMPLE 9

This example presents a prospective illustration of a commodity transport method to model operating modes for coal, grain, petroleum coke, or other slurry commodities in different conveying fluids or blends of conveying fluids.

A representative model of pressure-rated transport vessels is fabricated as in Example 8 with the addition of an interior multi-pierced baffle plate separating the vessel into an upper and lower compartment of approximately equal volume and having means of attaching filter fabric or fiberglass fine mesh to one side of the baffle to allow rough filtration of the contents upon inversion of the vessel.

Coal or petroleum coke of predetermined sulfur content, or grain of predetermined nitrogen content, may then be mixed with anhydrous ammonia or other fluid conveyors or blends and agitated magnetically over time at known temperatures and pressures as models of slurry transport operations. At the end of predetermined runs the vessel may be inverted to allow fluid to drain away from the solid phase material, thus providing a decanted solid product and fluid ammonia or other liquid suitable for recycle. Anhydrous ammonia, for example, may be bled off and recycled and the vessel vacuum pumped dry. The solid residuum, whether coal, coke, or grain may be analyzed to determine beneficiation as to lower sulfur content or higher nitrogen content under known conditions as to contact time with anhydrous ammonia. Residuum from the fluid compartment may be similarly analyzed for contaminants and potential recycle as feedstock to, for example, spent sulfuric acid burner plants by conventional methods.

While many details of the invention and the ways in which it can be implemented and applied are set forth in this specification, further variations, modifications, and substitutions that utilize and take advantage of the central discoveries that form the basis of this invention will be readily apparent to those skilled in the art and will thereby fall within the scope of this invention.

What is claimed is:

1. A method for transporting elemental sulfur through varying temperatures comprising:

(a) combining said elemental sulfur with a non-aqueous liquid carrier substantially comprising a member selected from the group consisting of anhydrous ammonia and sulfur dioxide which forms a fluid mixture, in which precipitation of said elemental sulfur due to drops in temperature is substantially absent and (b) conveying said fluid mixture by way of a transport vessel.

2. The method of claim 1 in which (b) is performed in the absence of any temperature control of said transport vessel other than by exposure to environmental conditions.

3. The method of claim 1 in which said fluid mixture is a slurry of solid elemental sulfur in a liquid solution of sulfur dissolved in said non-aqueous liquid carrier.

4. The method of claim 1 in which said transport vessel is a pipeline, and (b) comprises pumping said fluid mixture through said pipeline.

5. The method of claim 4 in which said pipeline has an inner surface of ferrous metal in contact with said fluid mixture.

6. The method of claim 4 in which said pipeline is surrounded by air.

7. The method of claim 4 in which said pipeline is an underground pipeline.

8. The method of claim 4 in which said pipeline is an underwater pipeline.

9. The method of claim 1 in which said non-aqueous liquid carrier is anhydrous ammonia.

10. The method of claim 9 in which said elemental sulfur constitutes at most about 65% by weight of said fluid mixture.

11. The method of claim 9 in which said elemental sulfur constitutes from about 20% to about 65% by weight of said fluid mixture.

12. The method of claim 9 in which said elemental sulfur constitutes from about 40% to about 60% by weight of said fluid mixture.

13. The method of claim 9 in which said elemental sulfur constitutes from about 50% to about 60% by weight of said fluid mixture.

14. The method of claim 9 in which (b) is performed at a temperature less than or equal to 35° C.

15. The method of claim 9 in which (b) is performed at a temperature less than or equal to 20° C.

16. The method of claim 1 in which said non-aqueous liquid carrier is sulfur dioxide.

17. The method of claim 16 in which said elemental sulfur constitutes at most about 65% by weight of said fluid mixture.

18. The method of claim 16 in which said elemental sulfur constitutes from about 1,800 ppm by weight to about 65% by weight of said fluid mixture.

19. The method of claim 16 in which said elemental sulfur constitutes from about 1% by weight to about 60% by weight of said fluid mixture.

20. The method of claim 16 in which said elemental sulfur constitutes from about 10% by weight to about 50% by weight of said fluid mixture.

21. The method of claim 16 in which (b) is performed at a temperature less than or equal to 40° C.

22. The method of claim 16 in which (b) is performed at a temperature less than or equal to about 20° C.

* * * * *